United States Patent Office 3,027,567
Patented Apr. 3, 1962

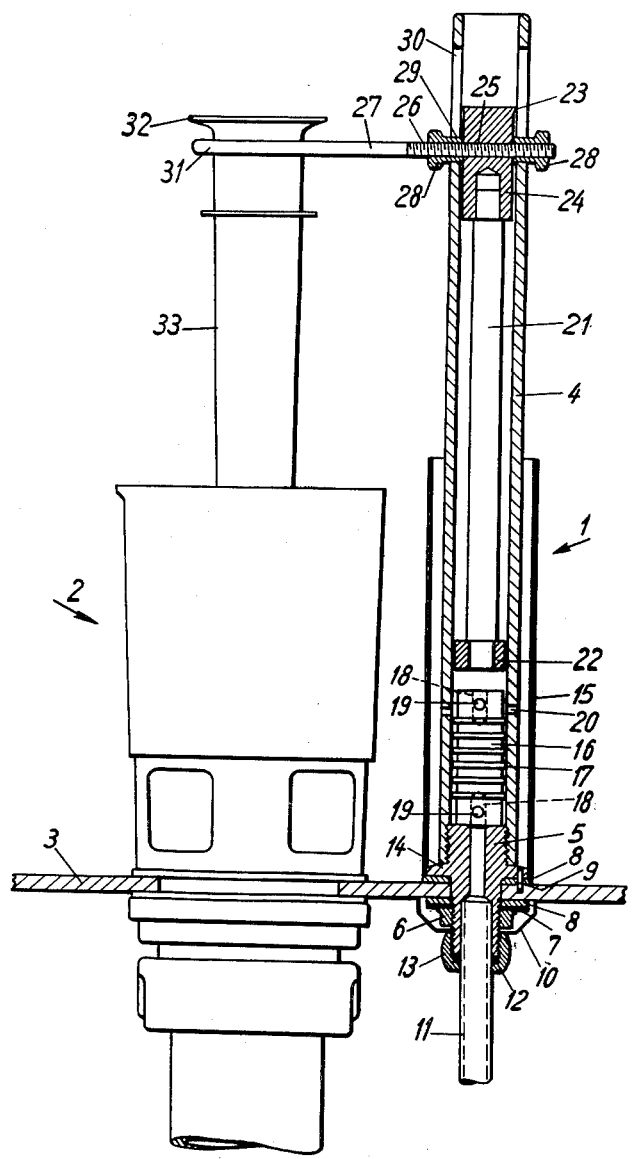

3,027,567
OPERATING DEVICE FOR A FLUSHING
CISTERN DISCHARGE VALVE
Paul Stähli, St. Gall, Switzerland, assignor to
Gebert & Cie, St. Gall, Switzerland
Filed Jan. 6, 1960, Ser. No. 812
Claims priority, application Switzerland Jan. 12, 1959
6 Claims. (Cl. 4—67)

The present invention relates to a hydraulic operating device for a flushing cistern discharge valve, and has the main object of providing a device of this kind which works very reliably even at abnormally low or abnormally high pressures of the water supply.

With this and other objects in view which will become apparent later from this specification and the accompanying drawing, I provide an operating device for a flushing cistern discharge valve, comprising in combination: a discharge valve, a cylinder arranged by the side of said discharge valve, connecting means for the connection of said cylinder to an external water supply source, a piston movable in said cylinder and capable of being displaced therein by the supply of water from the said external water supply source, and a dog movably arranged in said cylinder in the range of movement of said piston and connected to said discharge valve, said dog, when carried along by said piston in its movement, opening the said discharge valve.

Preferably the said piston is designed as a free piston.

These and other features of my invention will be clearly understood from the following description of a preferred embodiment thereof, given by way of example with reference to the accompanying drawing, which is an elevation partly in longitudinal section of the operating device for a flushing cistern discharge valve according to the present invention.

The operating device, denoted 1 as a whole, controls a conventional discharge valve 2 mounted on the bottom 3 of a water closet flushing cistern (otherwise not shown). The operating device 1 has a tube 4 to the lower end of which a nipple 5 is screwed. This nipple 5 is passed through the bottom 3 of the flushing cistern and fixed thereto by means of a nut 6. A washer is denoted 7, and two packing rings are denoted 8. A pin 9 serves for restraining the nipple 5 from turning and a hollow rosette 10 covers the nut 7.

A water supply pipe 11 is connected to the tube 4 by means of a squeezed packing 12 and a cap nut 13 engaging the nipple 5. On the circumference of a flange 14 of the nipple 5 the lower end of a tube 15 is attached which co-axially surrounds the tube 4, and is shorter than the latter.

In the tube 4, which serves as a cylinder, a free piston 16 is arranged, which in the rest position illustrated rests on the nipple 5. The free piston 16 has annualar ribs 17 and is provided on each end with an axial blind bore 18, which by a transverse bore 19 forms a passage in communication with the interior of the tube 4. The latter is provided with two holes 20 slightly above the uppermost rib 17. Above the free piston 16 and at some distance from it there is arranged in the tube 4 an axial rod 21, which is provided at its lower end with an abutment piece 22.

The rod 21 is connected on top with a guide member 24, contacting the wall of the tube at 23 and provided with a transverse bore 25. Through this transverse bore 25 a screw threaded portion 26 of a dog 27 is pushed, which is fixed to the guide member by means of two nuts 28. Each nut 28 has a collar 29, which is guided in a longitudinal slot 30 of the tube 4. The free end 31 of the dog 27 is made fork- or hook-shaped (not shown) and reaches under the turned-up edge 32 of a tube 33, on the lower end of which the obturator member (not shown) of the discharge valve 2 is attached and which serves at the same time as the overflow tube for the flushing cistern.

The water supply pipe 11 is connected through an obturator member (not shown) to the water distributing mains or to a small automatic pump of a conventional kind, at which merely a push button has to be pressed, in order to feed water through the pipe 11 and the nipple 5 into the tube 4. When the aforesaid obturator member is opened or the said pump is set in action, the water entering into the tube 4 forces the free piston 16 upward, so that it hits the abutment 22 and moves the rod 21 upward. Thereby the dog 27 is likewise moved upward, so that it carries the tube 33 with it, and opens the discharge valve 2.

When the pipe 11 is closed by the said obturator member or when the push button of the said pump is released, the free piston 16 and the rod 21 sink back into their position illustrated. It should be noted that between ribs 17 and the tube 4 there is sufficient clearance for permitting the water located below the free piston 16 to get on top of the free piston 16 when the said obturator member is used. When a pump is used the water located under the free piston flows through the lower transverse bore 19 and associated blind bore 18 back into the pipe 11. The upper blind bore 18 and associated transverse bore 19 could be dispensed with, and are provided only in order that the free piston 16 may be inserted in either position into the tube 4 on assembly.

When discharging the flushing cistern the annular space between the tubes 4 and 15 remains filled with water. This water can penetrate through the bores 20 into the tube 4 and can get past the free piston 16 through the bores 19 and 18 into the pipe 11, in order to replace in the case of the use of a pump any small losses which might have occurred through slight leakages in the pipe and/or pump. The bores 20 have yet another purpose: Assuming these bores 20 were not existing and the pipe were connected to water supply mains of high pressure, e.g. over 6 atm. gauge, the following difficulty would arise: when the rod 21 is in its uppermost position determined by the upper end of the slots 30, the water flowing past the free piston 16 and past the abutment 22 would, even in the upper part of the tube 4, have such a high pressure, that it would spray obliquely upward out of the slots 30. This spray water then would run along the inside of the flushing cistern lid and might get under the margin with said lid rests on the walls of the flushing cistern, and to the outside of the latter. By the bores 20 this difficulty is overcome in that when the free piston is with its lowest annular rib 17 above the bores 20, the water can flow off through the latter into the annular space between the two pipes 4 and 15 and can flow off without trouble at the top of the tube 15.

Instead of using a free piston 16 one may alternatively use a piston fixed directly to the lower end of the rod 21. In this case it may however happen that, when using a pump, the pressure of the latter does not suffice for opening the discharge valve 2 when the obturator body thereof for one reason or other should stick too firmly on its seat. On the other hand, the free piston 16 has a certain kinetic energy, when hitting the abutment 22 which it transfers to the latter impact-wise, so that the discharge valve is opened with safety.

In contrast to a solution of the problem which might have been used previously, namely to connect the pipe 21 immediately to the discharge valve 2 under a float body (not shown) accomodated therein, the operating device illustrated has the advantage of functioning much more reliably. It should also be remarked that the device described is used in practice particularly at comparatively low flushing cistern pressures.

While I have herein described and in the accompanying drawing illustrated what may be considered a typical and particularly useful embodiment of my said invention, I wish it to be understood that I do not limit myself to the particular details and dimensions described and illustrated; for obvious modifications will occur to a person skilled in the art.

What I claim as my invention and desire to secure by Letters Patent, is:

1. An operating device for a flushing cistern discharge valve comprising in combination: a discharge valve, a cylinder tube arranged by the side of said discharge valve, connecting means connecting one end of said cylinder tube to an external water supply source, a free piston movable longitudinally through said cylinder tube and capable of being displaced therein by the supply of water from the said external water supply source, a rod movably arranged in said cylinder tube and having an abutment at its lower end in juxtaposition with and movably engageable by said free piston, and a dog connected to the upper end of said rod and to the said discharge valve, said dog, when carried along by said rod under the action of said free piston, opening the said discharge valve.

2. An operating device as claimed in claim 1, wherein the said cylinder tube is provided with at least one longitudinal slot adjacent its upper end and wherein the said rod has a guide piece attached to its upper end and guided in said slot, the said dog being fixed to the said guide piece.

3. An operating device as claimed in claim 1 comprising a second tube shorter than the said cylinder tube and co-axially surrounding the lower end of the latter, the said cylinder tube being in communication with the interior of said second tube through holes in its side.

4. An operating device as claimed in claim 1, wherein the said free piston has annular ribs, clearance being provided between the circumference of said ribs and the inner surface of said cylinder tube.

5. An operating device as claimed in claim 1, wherein a passage is provided in the lower portion of said free piston allowing the return flow of water contained in said cylinder tube into said connecting means to the said external water supply source.

6. An operating device for the discharge valve of a flushing cistern, comprising in combination: a flushing cistern bottom, a discharge valve fixed to said bottom, a nipple passing through and fixed to the said bottom, connecting means connecting said nipple to an external water supply source, a cylinder tube screwed to the said nipple so as to be vertically disposed above the said flushing cistern bottom, said nipple having a flange of a diameter larger than the outer diameter of said cylinder tube, a second tube shorter than said cylinder tube attached to said flange and co-axially surrounding the lower end of said cylinder tube which is provided with lateral holes connecting the interior of said cylinder tube with the interior of said second tube, a free piston axially movable with clearance within said cylinder tube and normally disposed at one end thereof to seal off the external water supply, a rod arranged longitudinally movable in said cylinder tube and having an abutment at its lower end in juxtaposition to and movably engageable by said free piston, and a dog fixed to the upper end of said rod and movable longitudinally therewith and engaging the said discharge valve, opening the latter when axially displaced by the movement of the said free piston.

References Cited in the file of this patent

FOREIGN PATENTS 379,395 Germany       Aug. 22, 1923